(12) United States Patent
Gabdrakipov (10) Patent No.: US 11,709,900 B2
(45) Date of Patent: Jul. 25, 2023

(54) AUTOMATED WEB PAGE ACCESSING

(71) Applicant: GAP Intelligence, Inc., San Diego, CA (US)

(72) Inventor: Timur Gabdrakipov, San Diego, CA (US)

(73) Assignee: GAP Intelligence, Inc., San Diego, CA (US)

( * ) Notice: Subject to any disclaimer, the term of this patent is extended or adjusted under 35 U.S.C. 154(b) by 0 days.

(21) Appl. No.: 17/828,405

(22) Filed: May 31, 2022

(65) Prior Publication Data

US 2022/0292142 A1    Sep. 15, 2022

Related U.S. Application Data

(63) Continuation of application No. 16/677,861, filed on Nov. 8, 2019, now Pat. No. 11,366,862.

(51) Int. Cl.
*G06F 16/951* (2019.01)
*G06F 16/958* (2019.01)
*H04L 9/40* (2022.01)

(52) U.S. Cl.
CPC .......... *G06F 16/951* (2019.01); *G06F 16/958* (2019.01); *H04L 63/0281* (2013.01)

(58) Field of Classification Search
CPC ... G06F 16/951; G06F 16/958; H04L 63/0281
See application file for complete search history.

(56) References Cited

U.S. PATENT DOCUMENTS

| | | | | |
|---|---|---|---|---|
| 6,418,452 B1* | 7/2002 | Kraft | ..................... | G06F 16/951 709/224 |
| 6,662,230 B1* | 12/2003 | Eichstaedt | .............. | H04L 63/10 709/224 |
| 6,938,170 B1* | 8/2005 | Kraft | ....................... | G06F 21/50 707/999.005 |
| 7,334,039 B1* | 2/2008 | Majkut | ................... | H04L 67/01 715/741 |
| 7,546,370 B1* | 6/2009 | Acharya | ............... | G06F 16/951 709/227 |
| 8,042,112 B1* | 10/2011 | Zhu | ....................... | G06F 16/951 707/706 |

(Continued)

*Primary Examiner* — Jimmy H Tran
(74) *Attorney, Agent, or Firm* — Sunstein LLP (57) ABSTRACT

An apparatus for accessing web pages includes: a communication interface; and a processor communicatively coupled to the communication interface and configured to: receive a web crawler request, from the communication interface, to access a specified web page; select a first selected proxy server from among a plurality of proxy servers; send, via the communication interface, a first access request to the first selected proxy server requesting access to the specified web page; receive, via the communication interface, a response from the selected proxy server corresponding to the first access request; analyze the response from the selected proxy server; select a second selected proxy server from among the plurality of proxy servers in response to determining from the response that the first access request was denied, and send, via the communication interface, a second access request to the second selected proxy server requesting access to the specified web page.

20 Claims, 4 Drawing Sheets

(56) References Cited

U.S. PATENT DOCUMENTS

| | | | |
|---|---|---|---|
| 8,782,031 B2* | 7/2014 | Wierman | G06F 16/951 707/721 |
| 8,868,535 B1* | 10/2014 | Paiz | G06F 16/951 707/706 |
| 2004/0025055 A1* | 2/2004 | Hamadi | G06F 16/951 709/224 |
| 2006/0224592 A1* | 10/2006 | Kapadia | G06F 16/951 |
| 2007/0214129 A1* | 9/2007 | Ture | G06F 16/951 |
| 2007/0283425 A1* | 12/2007 | Ture | G06F 21/6263 726/5 |
| 2008/0082662 A1* | 4/2008 | Dandliker | H04L 63/10 709/225 |
| 2008/0183889 A1* | 7/2008 | Andreev | H04L 67/02 709/238 |
| 2011/0078131 A1* | 3/2011 | Wen | G06F 16/951 707/711 |
| 2011/0106786 A1* | 5/2011 | Waters | G06F 16/951 707/E17.108 |
| 2011/0106787 A1* | 5/2011 | Waters | G06F 16/9535 707/E17.108 |
| 2011/0307467 A1* | 12/2011 | Severance | H04L 67/02 707/E17.108 |
| 2013/0117252 A1* | 5/2013 | Samaddar | G06F 16/951 707/E17.108 |
| 2013/0144858 A1* | 6/2013 | Lin | G06F 16/951 707/E17.108 |
| 2013/0262416 A1* | 10/2013 | Devarajan | G06F 16/951 707/694 |
| 2013/0262428 A1* | 10/2013 | Devarajan | G06F 16/27 707/E17.108 |
| 2014/0344891 A1* | 11/2014 | Mullick | H04L 63/105 726/1 |
| 2015/0180875 A1* | 6/2015 | Kay | H04W 12/128 726/4 |
| 2015/0242508 A1* | 8/2015 | Brawer | G06F 16/951 707/709 |
| 2016/0055243 A1* | 2/2016 | Xu | G06F 16/9535 707/709 |
| 2016/0188717 A1* | 6/2016 | Rosenberg | G06F 16/951 707/689 |
| 2016/0299971 A1* | 10/2016 | Ren | G06F 16/951 |
| 2017/0185678 A1* | 6/2017 | Zou | G06F 16/9566 |
| 2017/0237824 A1* | 8/2017 | Vignali | H04L 67/01 709/203 |
| 2017/0322902 A1* | 11/2017 | Baldry | H04L 41/0893 |
| 2018/0041530 A1* | 2/2018 | Tang | H04L 63/1425 |
| 2018/0167412 A1* | 6/2018 | Barrett | H04L 63/1491 |
| 2019/0340298 A1* | 11/2019 | Nistala | G06F 16/24573 |
| 2019/0364029 A1* | 11/2019 | Krishnaprasad | G06F 21/31 |
| 2019/0373012 A1* | 12/2019 | Mattson | H04L 63/1441 |
| 2021/0120034 A1* | 4/2021 | Starov | G06F 21/563 |
| 2021/0141843 A1* | 5/2021 | Gabdrakipov | G06F 16/951 |
| 2022/0100808 A1* | 3/2022 | Juravicius | G06F 16/951 |
| 2022/0345487 A1* | 10/2022 | Starov | G06F 21/563 |

* cited by examiner

AUTOMATED WEB PAGE ACCESSING

CROSS-REFERENCE TO RELATED APPLICATIONS

This application is a continuation of application Ser. No. 16/677,861, filed Nov. 8, 2019, entitled "AUTOMATED WEB PAGE ACCESSING," which is assigned to the assignee hereof, and the entire contents of which are hereby incorporated herein by reference for all purposes.

BACKGROUND

Web crawlers are Internet robots (bots) that are software applications that attempt to access websites in an automated fashion to obtain data from desired webpages. Some website hosts, however, may inhibit, or attempt to inhibit, automated access to their websites, often because the data on the websites are so sought after that if automated access were permitted, manual access (e.g., by individual human consumers) may be so slow as to deter visitors (e.g., customers) from visiting the websites. The website hosts may therefore attempt to determine whether an access request is automated, and block automated requests (i.e., prevent the automated requests from being granted access to the website). The host may identify a requester (corresponding to a single source Internet Protocol (IP) address) as a robot in response to a request density (i.e., a number of requests divided by time) from the requester to the website exceeding a threshold.

The host may block web crawlers in different ways, and may change how requests or blocked and/or how request blockages are indicated over time. Web crawlers may analyze responses from hosts to determine whether requests were blocked. The host may change responses over time and the web crawlers may be updated to recognize the new responses as request rejections.

SUMMARY

An example of an apparatus for accessing web pages includes: a communication interface; and a processor communicatively coupled to the communication interface and configured to: receive a web crawler request, from the communication interface, to access a specified web page; select a first selected proxy server from among a plurality of proxy servers; send, via the communication interface, a first access request to the first selected proxy server requesting access to the specified web page; receive, via the communication interface, a response from the selected proxy server corresponding to the first access request; analyze the response from the selected proxy server; select a second selected proxy server from among the plurality of proxy servers in response to determining from the response that the first access request was denied; and send, via the communication interface, a second access request to the second selected proxy server requesting access to the specified web page.

Implementations of such an apparatus may include one or more of the following features. The processor is configured to schedule a third request requesting access to the specified web page for later transmission to one of the proxy servers of the plurality of proxy servers in response to a threshold amount of failed access to the specified web page. The threshold amount of failed access is a threshold number of requests being denied access to the specified web page. The threshold amount of failed access is a threshold amount of time since the first access request is sent. To schedule the third request the processor is configured to place the third request in a queue of web page requests. To select the first selected proxy server the processor is configured to select randomly from among the plurality of proxy servers. The processor is configured to establish persistent connections to the web crawler and the plurality of proxy servers via the communication interface. The first request and the second request are configured to request access to all of the specified web page.

An example of a non-transitory, processor-readable storage medium includes processor-readable instructions stored thereon configured to cause a processor to: select a first selected proxy server from among a plurality of proxy servers in response to receipt of a web crawler request, from a communication interface, to access a specified web page; send, via the communication interface, a first access request to the first selected proxy server requesting access to the specified web page; analyze a response from the selected proxy server corresponding to the first access request, select a second selected proxy server from among the plurality of proxy servers in response to determining from the response that the first access request was denied; and send, via the communication interface, a second access request to the second selected proxy server requesting access to the specified web page.

Implementations of such a storage medium may include one or more of the following features. The instructions are configured to cause the processor to schedule a third request requesting access to the specified web page for later transmission to one of the proxy servers of the plurality of proxy servers in response to a threshold amount of failed access to the specified web page. The threshold amount of failed access is a threshold number of requests being denied access to the specified web page. The threshold amount of failed access is a threshold amount of time since the first access request is sent. To schedule the third request the instructions are configured to cause the processor to place the third request in a queue of web page requests. To select the first selected proxy server the instructions are configured to cause the processor to select randomly from among the plurality of proxy servers.

An example of a method for accessing a web page includes: receiving a web crawler request, from a web crawler via a communication interface, to access a specified web page; selecting a first selected proxy server from among a plurality of proxy servers; sending, via the communication interface, a first access request to the first selected proxy server requesting access to the specified web page; receiving, via the communication interface, a response from the selected proxy server corresponding to the first access request; analyzing the response from the selected proxy server; selecting a second selected proxy server from among the plurality of proxy servers in response to determining from the response that the first access request was denied; sending, via the communication interface, a second access request to the second selected proxy server requesting access to the specified web page.

Implementations of such a method may include one or more of the following features. The method is for accessing web pages from a crawler adapter that includes the communication interface, the method further comprising establishing always-on connections between the crawler adapter and the plurality of proxy servers. The method includes scheduling a third request requesting access to the specified web page for later transmission to one of the proxy servers of the plurality of proxy servers in response to a threshold amount of failed access to the specified web page. The threshold amount of failed access is a threshold number of requests being denied access to the specified web page or a threshold amount of time since the first access request is sent. Scheduling the third request comprises placing the third request in a queue of web page requests. Selecting the first selected proxy server comprises randomly selecting the first selected proxy server from among the plurality of proxy servers.

DETAILED DESCRIPTION

Techniques are discussed herein for helping ensure that automated requests for access to web pages succeed in obtaining information from the web pages. For example, a web crawler may provide a request for access to a web page to a crawler adapter. The crawler adapter can select a proxy server, from a set of proxy servers, to use to send the request to a website host. The crawler adapter may, for example, randomly select one of the proxy servers to send the request. The crawler adapter sends the request to the selected proxy server, which sends the request to the website host using the selected proxy server's Internet Protocol (IP) address as the source of the request. If the website host provides access to the website, e.g., to a particular web page, in response to the request, then the website host provides a response providing requested information which the proxy server provides to the crawler adapter. The crawler adapter may provide the requested information to the web crawler and/or may provide the IP address of the proxy server that was able to gain access to the website, and the web crawler may use this IP address to send anew request to the website host. If the website host denies access to the website for the request, then the website host provides a response without the requested information to the proxy server, which relays the response to the crawler adapter. The crawler adapter may analyze the response to determine that the requested access has been denied (blocked), or may conclude that access has been denied if no response is received within a threshold amount of time. The crawler adapter responds to the denial by selecting another proxy server from the set of proxy servers and sending the request to the newly-selected proxy server. The newly-selected proxy server sends the request to the website host using the newly-selected proxy server's IP address as the source of the request. The response from the website host is analyzed and the requested information, if provided in the response, is provided to the web crawler and the process repeated if the requested information is not provided in the response. This process may be repeated, e.g., until the requested information is obtained from the website host, or until a threshold number of unsuccessful attempts have been made, or until a threshold amount of time passes without the requested information being provided, etc. These techniques are examples, however, and are not exhaustive of the disclosure provided herein.

Items and/or techniques described herein may provide one or more of the following capabilities, as well as other capabilities not mentioned. Automated access to web page content may be improved. Numbers of denied automated requests for web page content may be reduced. Access to a web host may be improved, e.g., by using proxy servers disposed, configured, and connected to the web host to have low latency from proxy server to web host and/or by using proxy servers with stable network connections to the web host. A web host may be accessed by a web crawler where the web crawler and the web host use different, incompatible communication protocols. Other capabilities may be provided and not every implementation according to the disclosure must provide any, let alone all, of the capabilities discussed.

Figure 1:
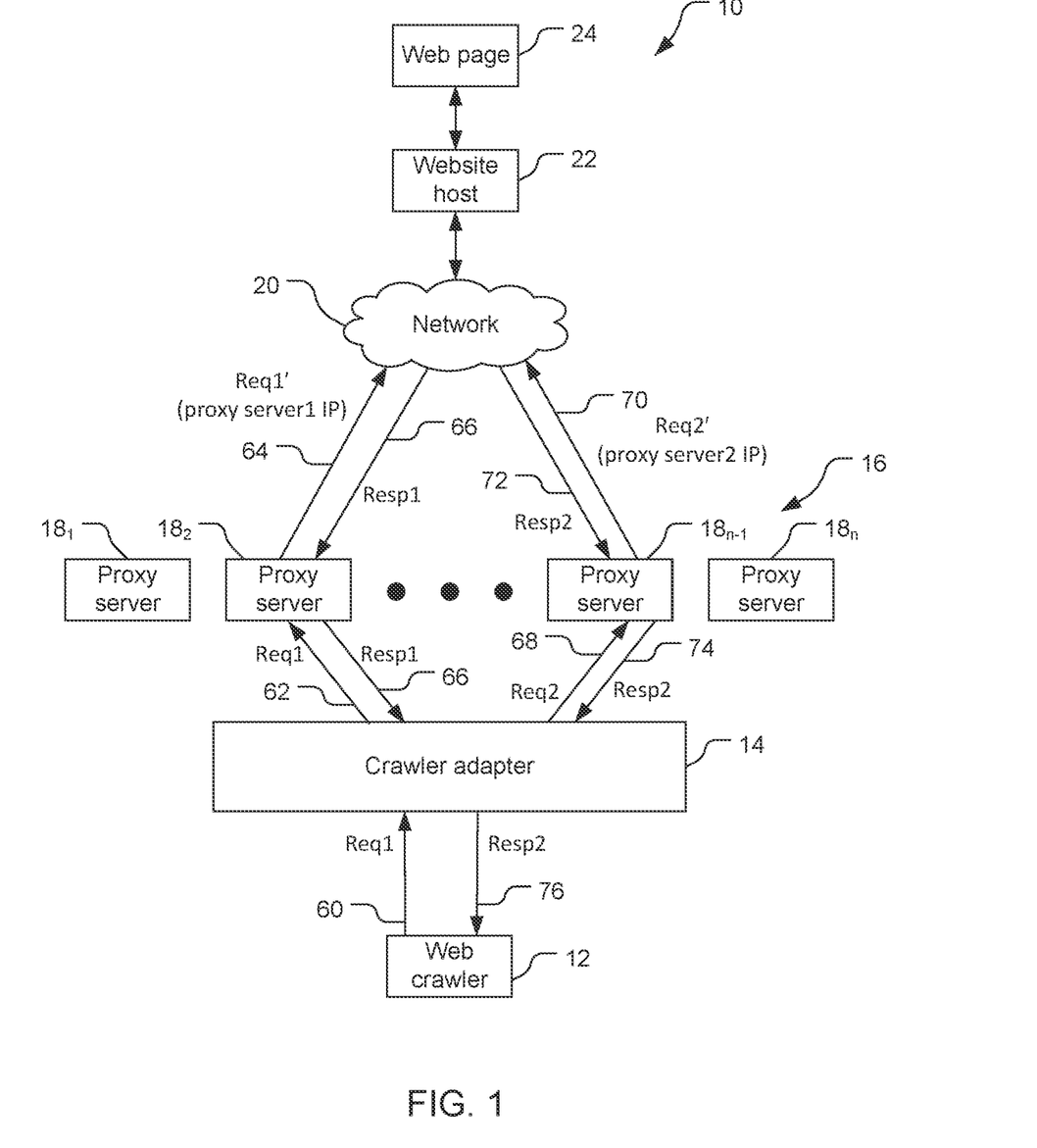
FIG. 1 is a simplified block diagram of a website hosting and accessing system.

Referring to FIG. 1, a website access system 10 includes a web crawler 12, a crawler adapter 14, a proxy server set 16 that includes proxy servers $18_1$-$18_n$, a network 20, a website host 22, and a web page 24. The web crawler comprises a computer system configured to generate and send requests for access to web pages, e.g., to request some or all information from one or more web pages. The web crawler 12 is configured to communicate bi-directionally with the crawler adapter 14. The crawler adapter 14 is configured to communicate bi-directionally with the web crawler 12 and the proxy servers $18_1$-$18_n$. The proxy servers $18_1$-$18_n$ may be configured to each have a different IP address. Also or alternatively, the proxy servers $18_1$-$18_n$ may be configured to communicate bi-directionally with the crawler adapter 14 and with the network 20 to relay (send) requests received from the crawler adapter to the network 20, and to relay (send) responses received from the network 20 to the crawler adapter 14. The network 20 is a communication network, e.g., the world-wide web, configured to relay packetized information from sources to destinations. The website host 22 is a server configured to communicate bi-directionally with the network 20 and to provide information from the web page 24 to the network 20 in response to a request or to deny access to information of the web page 24, e.g., in response to determining that a requester is a robot. The system 10 is configured to facilitate automated access to information of the web page 24 by the web crawler 12. The crawler adapter 14 may be configured to work with a variety of different web crawlers 12, e.g., the crawler adapter 14 may be crawler agnostic.

The proxy servers 18 in the proxy server set 16 may be disposed in various relative locations. For example, the proxy servers 18 may be disposed near each other, or with one or more subsets of proxy servers 18 disposed near each other but with one or more other proxy servers 18 or one or more other subsets of proxy servers 18 disposed remotely (e.g., in different cities, states, provinces, countries, continents, etc.). The proxy servers 18 may be disposed at various locations around the world, e.g., to increase the likelihood that a proxy server 18 will be disposed in a geographic area (e.g., the same country as, within a threshold distance of, etc.) that may cause the website host 22 to determine that the requester is not a robot. One or more of the proxy servers 18 may be disposed geographically close enough to the website host 22 to help ensure a high connection speed between the proxy server 18 and the website host 22, e.g., to reduce latency, which may improve reachability of (access to) the website host 22. The proxy servers 18 may or may not be dedicated to the system 10. For example, one or more of the proxy servers 18 may be a computer of a private person, and thus have a residential IP address. One or more of the proxy servers 18 may have a residential IP address even if the proxy server 18 is not a residential server.

Figure 2:
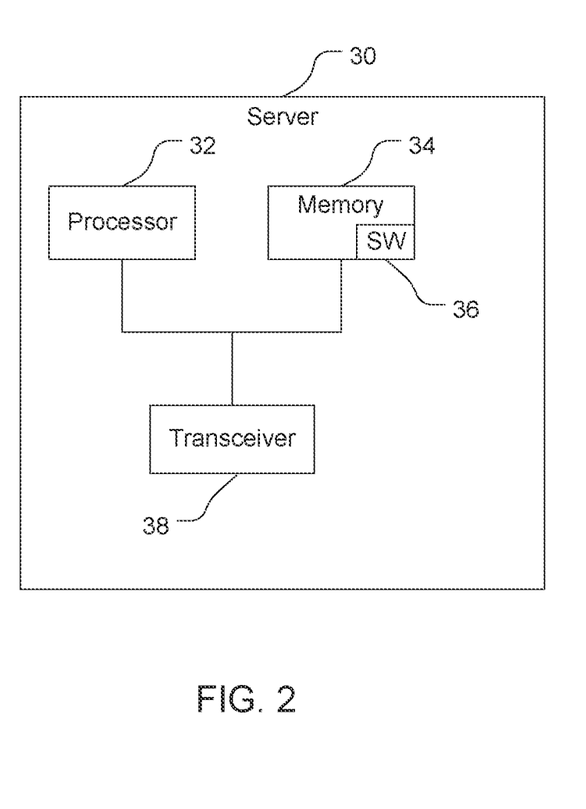
FIG. 2 is a simplified block diagram of a computer system of the system shown in FIG. 1.

Referring to FIG. 2, a computer system includes a processor 32, a memory 34 including software (SW) 36, and a transceiver 38. The system 30 may be an example of the web crawler 12, any of the proxy servers 18, and/or the host 22. In each case, the processor 32 and the memory 34 may be configured differently, e.g., with the software 36 comprising different instructions depending on the device provided by the system 30 in order to perform the respective functions. The processor 32 may be an intelligent hardware device, for example a central processing unit (CPU), such as those made or designed by ARM®, Intel® Corporation, or AMDX, a microcontroller, an application specific integrated circuit (ASIC), etc. The processor 32 may comprise multiple separate physical entities that can be distributed in the system 30. The memory 34 may include random access memory (RAM) and/or read-only memory (ROM). The memory 34 is a non-transitory, processor-readable storage medium that stores the software 36 which is processor-readable, processor-executable software code containing instructions that are configured to, when performed, cause the processor 32 to perform various functions described herein. The description may refer only to the processor 32 performing the functions, but this includes implementations such as where the processor 32 executes software and/or firmware. The description may refer to the web crawler 12, or the proxy server 18, or the host 22 performing a function, and this refers to the appropriate component(s) of the web crawler 12, or the proxy server 18, or the host 22 performing the function. Where the description refers to the crawler adapter 14 performing a function, the function may be performed using the processor 32, the memory 34, and/or the transceiver 38 and/or any other appropriate item (e.g., other hardware, firmware, etc.). The software 36 may not be directly executable by the processor 32 and instead may be configured to, for example when compiled and executed, cause the processor 32 to perform the functions. Whether needing compiling or not, the software 36 contains the instructions to cause the processor 32 to perform the functions. The processor 32 is communicatively coupled to the memory 34 and the transceiver 38. The processor 32 in combination with the memory 34, and/or the transceiver 38 may provide means for performing functions as described herein. The software 36 can be loaded onto the memory 34 by being downloaded via a network connection, uploaded from a disk, etc.

The transceiver 38 is configured for bi-directional communication. The transceiver 38 of the web crawler 12 is configured to communicate bi-directionally with the crawler adapter 14. The transceiver 38 of each of the proxy servers 18 is configured to communicate bi-directionally with the crawler adapter 14 and with the network 20 (e.g., with the transceiver 38 including a network interface card (NIC)). The transceiver 38 of the website host 22 is configured to communicate bi-directionally with the network 20. The website host 22 is configured to communicate bi-directionally with the web page, but the web page 24. The transceiver 38 of the web crawler 12 may be configured to communicate bi-directionally with the web page 24, e.g., if the web page 24 is disposed remotely from the website host 22. The web page 24 may be information stored in the memory 32 and bi-directionally accessible by the processor 32.

Figure 3:
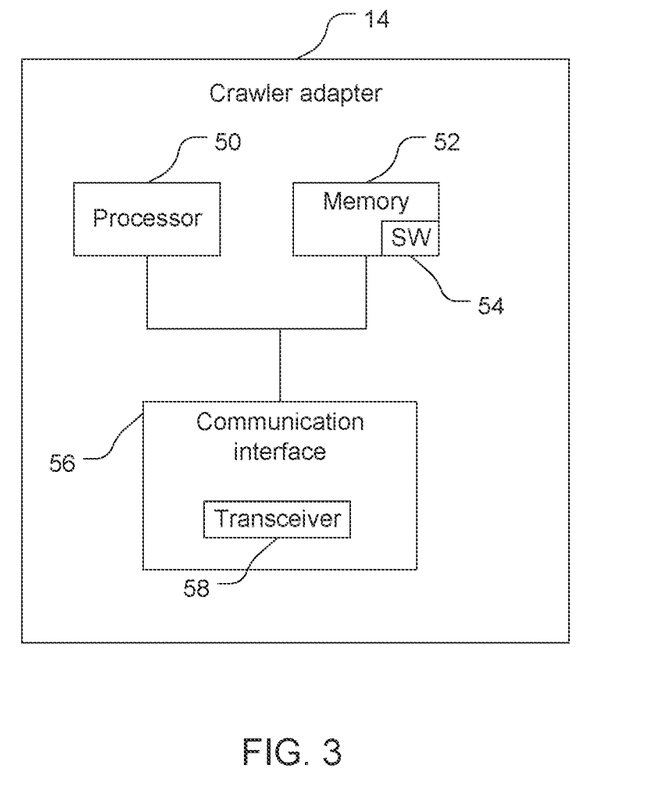
FIG. 3 is a simplified block diagram of a crawler adapter of the system shown in FIG. 1.

Referring to FIG. 3, with further reference to FIG. 1, an example of the crawler adapter 14 comprises a computer system including a processor 50, a memory 52 including software (SW) 54, and a communication interface 56 including a transceiver 58. The processor 50 may be an intelligent hardware device, for example a central processing unit (CPU), such as those made or designed by ARM®, Intel®, Corporation, or AMD®, a microcontroller, an application specific integrated circuit (ASIC), etc. The processor 50 may comprise multiple separate physical entities that can be distributed in the crawler adapter 14. The memory 52 may include random access memory (RAM) and/or read-only memory (ROM). The memory 52 is a non-transitory, processor-readable storage medium that stores the software 54 which is processor-readable, processor-executable software code containing instructions that are configured to, when performed, cause the processor 50 to perform various functions described herein. The description may refer only to the processor 50 performing a function, but this includes implementations such as where the processor 50 executes software and/or firmware. The description may refer to the web crawler 14 performing a function, and this refers to the appropriate component(s) of the web crawler 14 performing the function. Where the description refers to the crawler adapter 14 performing a function, the function may be performed using the processor 50, the memory 52, and/or the communication interface 36 and/or any other appropriate item (e.g., other hardware, firmware, etc.). The software 54 may not be directly executable by the processor 50 and instead may be configured to, for example when compiled and executed, cause the processor 50 to perform the functions. Whether needing compiling or not, the software 54 contains the instructions to cause the processor 50 to perform the functions. The processor 50 is communicatively coupled to the memory 52. The processor 50 in combination with the memory 52, and/or the communication interface 56 may provide means for performing functions as described herein, for example, the communication interface 56, and possibly the processor 50, may comprise means for receiving web crawler requests, means for sending access requests to proxy servers, and/or means for receiving responses from proxy servers. The processor 50, possibly in conjunction with the memory 52, may comprise means for selecting a proxy server to which to send an access request, and/or means for analyzing responses from proxy servers. The software 54 can be loaded onto the memory 52 by being downloaded via a network connection, uploaded from a disk, etc.

The processor 50 may be configured to determine that a web crawler request is from a web crawler. The processor 50 may receive a request 60 from the web crawler 12 to access the web page 24 and to retrieve information from the web page 24. The request may include an IP address of the web crawler 12 to indicate that the source of the request is the web crawler 12. The processor 50 may analyze the request and determine that the request is from a web crawler, e.g., by determining the source of the request (e.g., by analyzing the IP address of the source of the request). For example, the processor 50 may use the source IP address of the request to find the source IP address in a table that indicates that the source IP address is associated with a web crawler, e.g., the web crawler 12. For example, the table could be associated with web crawlers, or the particular source IP address in the table may be associated with a web crawler generally or the web crawler 12 specifically. As another example, a portion of the IP address of the web crawler 12 may be associated with web crawlers, with another portion of the IP address specifically being associated with the particular web crawler 12.

The crawler adapter 14 may be configured to enable access to the web page 24 by the web crawler 12 where the web crawler 12 and the website host 22 use different, incompatible communication protocols. The crawler adapter 14 may be configured to be a protocol converter to communicate with the web crawler 12 and the proxy servers 18 according to different protocols. The crawler adapter 14 may be configured to convert a communication with the web crawler 12 in a first protocol to a second protocol, used by the host 22, for communication with one of the proxy servers 18, and to convert a communication in the second protocol from one of the proxy servers 18 to the first protocol for communication with the web crawler 12. For example, the crawler adapter 14 may be configured to convert communications between HTTP 1.1 and HTTP/2 protocols, e.g., used by the web crawler 12 and the host 22, respectively.

The processor 50 may be configured to relay a web crawler request to a proxy server 18 of the proxy server set 16. The processor 50 may be configured to send the request to one of the proxy servers 18 regardless of the source of the request, or may be configured to send the request to one of the proxy servers 18 in response to determining that the request is from a web crawler and to another server (not shown) in response to determining that the request is not from a web crawler. Alternatively, the system 10 may be configured to send only web crawler requests to the crawler adapter 14. The processor 50 may be configured to select one of the proxy servers $18_1$-$18_n$ to which to send the request Req1, e.g., in response to determining that the request is a web crawler request (i.e., a request from a web crawler). For example, the processor 50 may be configured to select one of the proxy servers 18 randomly from the proxy server set 16. The processor 50 may, for example, use a random-number generator, or a pseudo-random-number generator, to select one of the proxy servers 18. As another example, the processor 50 may select one of the proxy servers 18 in accordance with a schedule of the proxy servers 18. The schedule of the proxy servers 18 may not have the same proxy server 18 twice in a row, or the same proxy server 18 twice within a threshold number of selections, or may include each of the proxy servers 18 before repeating any of the proxy servers 18. Still other schema may be used for a schedule of the proxy servers 18. The schedule may help ensure that different proxy servers 18 will be selected for multiple consecutive requests for the same web page 24, and/or to the same website host 22. As an example to help illustrate techniques according to the disclosure, with reference to FIG. 1, the proxy server $18_2$ is assumed to be selected by the processor 50.

The processor 50 may send the web crawler request as a first request Req1 in a communication 62 to the selected proxy server 18, here the proxy server $18_2$ in this example. The processor 50 may send the request Req1 via the communication interface 56 (in particular the transceiver 58) to the selected proxy server $18_2$. The request Req1 may include the IP address of the web crawler 12, or an IP address of the crawler adapter 14, or perhaps no source address at all. The request Req1 indicates the desired web page and may indicate desired content within the web page.

The proxy server $18_2$ is configured to relay the request Req1 to the network 20 as a modified request Req1'. The proxy server $18_2$ is configured to produce the modified request Req1' by inserting an IP address of the proxy server $18_2$ as the source address (e.g., replacing the source address in the request Req1 from the crawler adapter 14 or adding the source address if none was present). The IP address of the proxy server $18_2$ (and for any other proxy server 18 of the proxy server set 16) is different from the IP address of the web crawler 12 to help conceal that the true source of the web page request is a web crawler (i.e., a robot or bot) and that the request is an automated request.

The modified request Req1' is provided by the network 20 to the website host 22 that analyzes and acts on the received request. The network 20 relays the modified request Req1' through one or more nodes until the modified request Req1' is provided to the website host 22. The website host 22 is configured to analyze the modified request Req1' and determine whether to grant the access to the web page 24 requested in the modified request Req1'. The website host 22 may apply one or more algorithms or tests to attempt to determine whether the request is an automated request or not, e.g., whether the original requesting entity is a human or a computer. For example, the host 22 may analyze text, one or more codes, one or more scripts, one or more cookies, a location of a requesting entity, etc. contained in the modified request Req1' to make the determination whether the request originated from a bot (i.e., is an automated request to be blocked). The host 22 may determine a request density (number of requests per unit of time) to make the determination as to whether the request is an automated request. Based on the determination of whether the request is automated or not, the website host grants access to (e.g., provides data from) the web page 24 or denies/blocks access to, or provision of information from, the web page 24.

The website host 22 is configured to provide a response Resp1, in response to the modified request Req1' in a communication 66 to the network 20 directed to the proxy server 18 that sent the modified request Req1', here the proxy server $18_2$. The response from the website host 22 may contain the requested information or indicate that access to the requested information has been granted, or may indicate that the requested information/access has been denied. In this example, the response Resp1 indicates that the requested information/access has been denied. The response Resp1 may indicate the denial in a variety of manners. For example, the response Resp1 may read "Access Denied" or some other text directly indicating denial. The response Resp1 may indicate an error code associated with denied access. For example, a status code of 4XX (i.e., a 400-series status code, with XX being integers) may indicate a denial of access, e.g., with a status code of 401 or 404 being synonymous with access being denied. As another example, text of the response Resp1 may include one or more words (e.g., robot, bot, captcha, any form of the word "deny" or of the work "block") that, either alone or in combination, or combined with the requested information not being present in the response Resp1, can be interpreted as access being denied. The presence of a CAPTCHA (Completely Automated Public Turing test to tell Computers and Humans Apart) challenge may indicate that the requested access/information was denied/blocked. As another example, absence of requested data may be used to determine that access to requested information was denied. The proxy server $18_2$ that sent the initial request, i.e., the modified request Req1', will relay the response Resp1 from the website host 22, received via the network 20, to the crawler adapter 14.

The crawler adapter 14 is configured to analyze the responses from website hosts to determine whether requested information, or access to the requested information, is provided or denied. The crawler adapter 14 may analyze the response Resp1 to determine whether the response Resp1 provides the information or access thereto, or indicates that access to the information has been denied. For example, the crawler adapter 14 may analyze the response Resp1 to determine whether text (e.g., one or more terms such as robot, bot, captcha, any form of the word "deny" or of the work "block", etc.) or other content of the response Resp1 is associated with the information being denied. The crawler adapter 14 may search for key words or phrases to determine that requested information is in the response Resp1, or that access to requested information has been granted (e.g., available for retrieval and/or will be provided subsequently), or that retrieval of requested information has been denied, e.g., access to requested information has been blocked. The crawler adapter 14, e.g., the processor 50, may also or alternatively search for non-text content such as a CAPTCHA image or other image indicative of access being, at least temporarily, denied. If the crawler adapter 14 determines that the response Resp1 includes requested information, or indicates that access to requested information has been granted, or that access to requested information has not been denied, then the crawler adapter 14 sends the response to the web crawler 12. The crawler adapter 14 may be modified over time to be adapted to changes in how responses indicate whether access to requested information is granted or denied. In the example shown in FIG. 1, access to the requested information based on the request Req1 is denied.

The crawler adapter 14 is configured to respond to access to requested information from the request Req1 being denied by selecting a newly-selected one of the proxy servers 18 to receive a new request for the requested information. For example, the crawler adapter 14 may be configured to respond to the response from the website host 22 indicating that access to requested information has been denied by selecting a newly-selected proxy server 18. Also or alternatively, the crawler adapter 14 may be configured to respond to a lack of receiving a response granting access to, or providing, requested information (e.g., within a threshold amount of time such as six seconds) by selecting a newly-selected proxy server 18.

The crawler adapter 14 may be configured to select the newly-selected proxy server 18 in one or more of a variety of manners. The crawler adapter 14 may be configured to randomly select the newly-selected proxy server 18. The crawler adapter 14 may be configured to ensure that the newly-selected proxy server 18 is different from the most-recently selected proxy server 18. For example, if the randomly-selected proxy server 18 is the same proxy server 18 that was just used to send the request Req1, then the crawler adapter will disregard the selection and make a new random selection. The crawler adapter 14 may select a subset of the proxy server set 16 and select a proxy server 18 within the subset randomly. For example, the crawler adapter 14 may select a subset of proxy servers 18 that are located in the same geographic region (e.g., a country) as the website host 22, which may increase the likelihood of the host 22 granting access to the requested information. The crawler adapter 14 may be configured to ensure that the newly-selected proxy server 18 is different from any of the proxy servers 18 selected to receive the request, or at least different from any of the proxy servers 18 that have been previously selected (e.g., within a threshold amount of time from the present time, or threshold number of prior selections) to receive the request. As another example, the processor 50 may select one of the proxy servers 18 in accordance with a schedule of the proxy servers 18. The schedule of the proxy servers 18 may not have the same proxy server 18 twice in a row, or the same proxy server 18 twice within a threshold number of selections, or may include each of the proxy servers 18 before repeating any of the proxy servers 18. Still other schema may be used for a schedule of the proxy servers 18. The schedule may help ensure that different proxy servers 18 will be selected for repeated transmissions of the request to the website host 22 (e.g., repeated requests for the same information from the same web page). In the example shown in FIG. 1, the crawler adapter 14 selects the proxy server $18_{n-1}$ to relay the new request to the website host 22.

The crawler adapter 14 is configured to respond to selection of the newly-selected proxy server 18 by sending a new request Req2 to the newly-selected proxy server 18 requesting access to the requested information, which is the same information requested by the original request Req1. The new request Req2 is configured to request the same information as requested by the first request Req1, e.g., the same web page 24. The crawler adapter 14 is configured to send the new request Req2 to the newly-selected proxy server, in this example the proxy server $18_{n-1}$, in a communication 68 and the newly-selected proxy server 18 sends a modified new request Req2', in a communication 70, with the source address being the IP address of the newly-selected proxy server $18_{n-1}$. In this way, the same information may be requested multiple times with different source IP addresses. This may result in the website host 22 granting access to the requested information, even if the access is denied one or more times, without the web crawler issuing multiple requests for the information. The crawler adapter 14 may maintain a connection with the web crawler 12 that is always on, and/or may maintain always-on connections to the proxy servers 18. The crawler adapter 14 may not need to establish (or reestablish) a connection to a new proxy server in order to send a new request in response to access to requested information being denied (e.g., as indicated in a response from the website host 22) because the connection is on-going. The on-going, i.e., always-on, connection allows a communication exchange without having to wait to establish a connection as the connection has been previously established and maintained. Thus, cost (e.g., time, power consumption, etc.) to establish a connection to a proxy server 18 is avoided to send such a request because the connection need not be established each time a request is to be sent because the connection is on-going and thus one connection may be used for sending multiple requests and/or receiving multiple responses. The proxy servers 18 may keep a connection to the host 22 open for a configurable period of time, e.g., five minutes.

The modified new request Req2' is provided to the website host 22 that, in this example, provides access to the requested information and sends response Resp2 that includes at least part of the requested information. The website host 22 is configured to analyze the information request and provide requested information, and/or access to requested information, in response to determining that the originator of the request is not a bot, or at least not determining that the original requester is a bot. The new response Resp2 is provided from the website host 22 through the network 20 to the newly-selected proxy server $18_{n-1}$ that sent the new request Req2 in a communication 72, which relays the new response Resp2 to the crawler adapter 14 in a communication 74.

Similar to the discussion above, the crawler adapter 14 is configured to analyze the new response Resp2, but in this example the crawler adapter 14 determines that the new response Resp2 includes requested information. The crawler adapter 14 is configured to respond to a response including requested information, or indicating that access to requested information is granted, by sending the response to the web crawler 12. Thus, in this example, the crawler adapter 14 sends the new response Resp2 (that includes requested information) to the web crawler 12 in a communication 76.

The crawler adapter 14 may be configured to indicate to the web crawler 12 that a request has been blocked successfully (i.e., that access to the requested information has been unsuccessful). For example, the crawler adapter 14 may be configured to send a communication to the web crawler 12 indicating that the request Req1 has been unsuccessful if a threshold amount of time (e.g., 30 seconds) has passed since the request Req1 was sent by the crawler adapter 14 in the communication 62 without requested information being obtained (in response to the initial request Req1 or any subsequent request corresponding to the initial request Req1). As another example, the crawler adapter 14 may be configured to send a communication to the web crawler 12 indicating that the request Req1 has been unsuccessful if a threshold number of requests corresponding to the initial request Req1 have been sent by the crawler adapter 14 without access to requested information being granted (e.g., without requested information being provided).

The web crawler 12 may be configured to respond in one or more ways to an indication from the crawler adapter 14 that the request has been blocked successfully. For example, the web crawler 12 may be configured to re-queue the request to be re-sent at a later time to the crawler adapter 14 (e.g., to place the request in a queue of requests, e.g., away from a front of the queue such as at the back of the queue of requests). The web crawler 12 may be configured to discard the request such that the request will not be re-sent to the crawler adapter 14, e.g., in response to the web crawler 12 determining that retrying the request is unlikely to be successful (e.g., if a response from the website host 22 or other entity indicates that the desired web page no longer exists (e.g., page not found code 404 being in the response), or that the requested information is otherwise no longer available or existing). The determination whether to re-queue a blocked request may be made by the crawler adapter 14 and the indication of a blocked request provided by the crawler adapter 14 may indicate to the web crawler 12 whether to re-queue the request. Also or alternatively, the crawler adapter 14 itself could re-queue the request for a later re-transmission by the crawler adapter 14 to one of the proxy servers 18 (that may be selected at the time of re-queuing or at another time, e.g., when the re-queued request is to be sent). The re-transmission of the request may re-start the process of attempting to obtain the requested information.

The crawler adapter 14 may be configured to request information from, and receive information from, secure web pages. For example, the crawler adapter 14 may be configured to use secure layers for communications 62, 66, 68, 74 for secure websites such as websites with an https uniform resource locator (URL).

Operation

Figure 4:
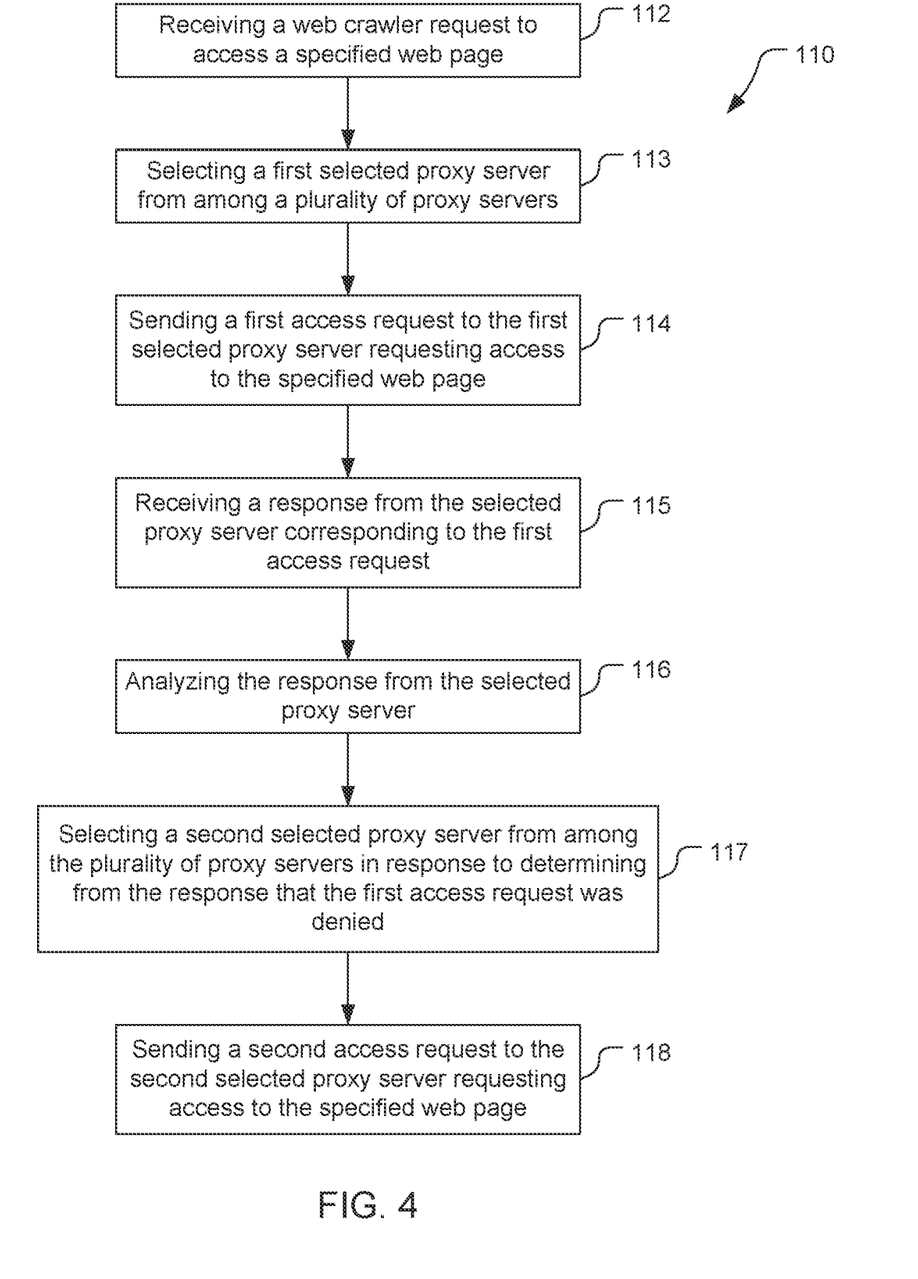
FIG. 4 is a block flow diagram of a method of accessing a web page.

Referring to FIG. 4, with further reference to FIGS. 1-3, a method 110 of accessing a web page includes the stages shown. The method 110 is, however, an example only and not limiting. The method 110 can be altered, e.g., by having stages added, removed, rearranged, combined, performed concurrently, and/or having single stages split into multiple stages.

At stage 112, the method 110 includes receiving a web crawler request to access a specified web page. The web crawler request may be received from a web crawler via a communication interface. For example, the web crawler 12 may send a request (e.g., the request Req1) to the crawler adapter 14 and the crawler adapter 14 may receive the request via the communication interface 56, in particular the transceiver 58. The request may be configured to request access to requested information of the specified web page. The request may request retrieval of the requested information (e.g., the price of a specified product).

At stage 113, the method 110 includes selecting a first selected proxy server from among a plurality of proxy servers. For example, the processor 50 may execute instructions stored in the memory 52, and in particular the software 54, to select a proxy server for sending the request to the website host 22 corresponding to the web page 24 that is the subject of the request Req1. The processor 50 may select the proxy server 18 randomly (including pseudo-randomly), by using a schedule (a planned order of the proxy servers 18), or in another way. The processor 50 may implement one or more techniques to help ensure that the selected proxy server 18 has not been used recently to send the same request to the same host 22.

At stage 114, the method 110 includes sending a first access request to the first selected proxy server requesting access to the specified web page. For example, the processor 50 sends the request Req1 to the selected proxy server 18 (e.g., the proxy server $18_2$ as shown in the example of FIG. 1). The request Req1 sent by the crawler adapter 14 to the selected proxy server $18_2$ may be identical to, or nearly identical to, the request Req1 as received by the crawler adapter 14. For example, the payload of the request Req1 sent by the crawler adapter 14 to the selected proxy server $18_2$ may be the same, but the source address indicating the address of the web crawler 12 may be replaced by the address of the crawler adapter 14. FIG. 1 shows the request Req1 being sent from the web crawler 12 to the crawler adapter 14 and from the crawler adapter 14 to the selected proxy server $18_2$ but this is to indicate that the same information is requested, not that request is identical in every way.

At stage 115, the method 110 includes receiving a response from the selected proxy server corresponding to the first access request. For example, the crawler adapter 14 receives the response Resp1 from the selected proxy server $18_2$ corresponding to the analysis done by the website host 22 on the modified request Req1' sent by the selected proxy server $18_2$ and received by the website host 22. The proxy server $18_2$ sends the modified request Req1', which is the original request Req1 but with the address (e.g., IP address) of the selected proxy server $18_2$ in the request instead of the address of the web crawler 12 or the crawler adapter 14. The host 22 receives and analyzes the modified request Req1' to determine whether to grant access to the requested information indicated in the modified request Req1'. The host 22 sends the response Resp based on the analysis performed by the processor 32 of the host 22. The response may grant access to the requested information and/or may provide some or all of the requested information. In the example shown in FIG. 1, however, the response Resp1 denies access to the requested information.

At stage 116, the method 110 includes analyzing the response from the selected proxy server. The crawler adapter 14, and in particular the processor 50, analyzes the response Resp1 to determine whether access to the requested information has been granted or denied. For example, the crawler adapter 14 may search the response Resp1 for words and/or phrases indicative of access being granted or denied. The crawler adapter 14 may also or alternatively search the response for other content (e.g., the presence or absence of a CAPTCHA) to determine, or help determine, whether access to the requested information has been allowed or blocked.

At stage 117, the method 110 includes selecting a second selected proxy server from among the plurality of proxy servers in response to determining from the response that the first access request was denied by a host of the specified web page. For example, the crawler adapter 14 selects one of the proxy servers 18 based on the crawler adapter 14 determining that the response Resp1 indicated that access to the requested information in the request Req1 was blocked, e.g., by the host 22 of the web page 24 from which information was requested. The crawler adapter 14 may select the proxy server 18 randomly or in accordance with a schedule or using another technique. The crawler adapter 14 may implement a technique to help ensure that a different one of the proxy servers 18 is selected than was used to send the original request Req1 to the host 22. This may increase the likelihood of gaining access to the requested information (i.e., decrease the likelihood of being denied access again to the requested information).

At stage 118, the method 110 includes sending a second access request to the second selected proxy server requesting access to the specified web page. For example, the crawler adapter 14 sends a second request Req2 to the newly-selected proxy server. e.g., the proxy server $18_{n-1}$ in the example shown in FIG. 1, with the second request Req2 requesting access to the same information that was requested by the first request Req1. The newly-selected proxy server $18_{n-1}$ sends a modified second request Req2' (with the IP address of the newly-selected proxy server $18_{n-1}$ as the source address) to the host 22. The host 22 analyzes the modified second request Req2', grants or denies access to the requested information of the modified second request Req2', and sends a response Resp2 indicative of the grant or denial of the access. In the example shown in FIG. 1, the response Resp2 provides requested information. The newly-selected proxy server $18_{n-1}$ forwards the response Resp2 to the crawler adapter 14. The crawler adapter 14 analyzes the response Resp2, determines that requested information access has been granted (in this example, requested information has been provided), and based on this determination, sends the response Resp2 to the web crawler 12.

The method 110 may include one or more other features. For example, the method 110 may include establishing always-on connections between the crawler adapter (e.g., the communication interface 56 of the crawler adapter 14) and the plurality of proxy servers (e.g., the proxy server set 16). The always-on connection may facilitate quicker access to requested information by eliminating cost to establish a connection in response to each request for information. The method 110 may include scheduling a third request requesting access to the specified web page for later transmission to one of the proxy servers of the plurality of proxy servers in response to a threshold amount of failed access to the specified web page. For example, the crawler adapter 14 may determine that a threshold number of requests for requested information have been sent to the host 22 without access to the requested information being granted. As another example, the crawler adapter 14 may determine that a threshold amount of time has passed since a first request for requested information was sent to the host 22 without the crawler adapter 14 receiving an indication that access to the requested information has been granted. The crawler adapter may schedule another request to be sent to one of the proxy servers 18 at a later time. For example, the crawler adapter 14 may put a request for the requested information in a queue such that the request will be handled later, when the request reaches the front of the queue. The crawler adapter 14 may select a proxy server 18 when the request reaches the front of the queue, and proceed as discussed above, e.g., with respect to stages 114-116 and stages 117, 118 as appropriate. Alternatively, the crawler adapter 14 may provide an indication of failed access to the web crawler 12 and the web crawler may schedule a request for later transmission to the crawler adapter 14 (e.g., by putting a new request in a queue of requests, e.g., for web pages and/or portions thereof).

Still other operations may be performed. For example, a user may provide information, e.g., instructions, to the web crawler 12 to guide the web crawler as to which information to request. For example, the user may provide a spreadsheet or other list of desired information (e.g., web pages, portions of web pages such as prices and/or features of products on web pages, etc.) that the web crawler 12 can access, read, and use to produce and send requests to the crawler adapter 14 for requested information. Retrieved requested information may be provided to the user, e.g., in the form of one or more reports. Statistics may be provided, e.g., statistics regarding the number of information requests submitted to the crawler adapter 14 and the number of information requests that were unsuccessful in obtaining the requested information may be tracked and reported to the user.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, an indication that a device is configured to perform a stated function means that the device contains appropriate equipment (e.g., circuitry, mechanical device(s), hardware, software (e.g., processor-readable instructions), firmware, etc.) to perform the stated function. That is, the device contains equipment that is capable of performing the stated function, e.g., with the device itself having been designed and made to perform the function, or having been manufactured such that the device includes equipment that was designed and made to perform the function. An indication that processor-readable instructions are configured to cause a processor to perform functions means that the processor-readable instructions contain instructions that when executed by a processor (after compiling as appropriate) will result in the functions being performed.

Also, as used herein, "or" as used in a list of items prefaced by "at least one of" or prefaced by "one or more of" indicates a disjunctive list such that, for example, a list of "at least one of A. B, or C," or a list of "one or more of A, B, or C" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, a wireless communication device may communicate through one or more wired connections as well as through one or more wireless connections.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The term "processor-readable storage medium," as used herein, refers to any medium that participates in providing data that causes a machine to operate in a specific fashion. Using a computer system, various processor-readable storage media might be involved in providing instructions/code to processor(s) for execution and/or might be used to store and/or carry such instructions/code (e.g., as signals). In many implementations, a processor-readable storage medium is a physical and/or tangible storage medium. Such a storage medium may take many forms, including but not limited to, non-volatile media and volatile media. Non-volatile media include, for example, optical and/or magnetic disks. Volatile media include, without limitation, dynamic memory.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Also, configurations may be described as a method or process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform described tasks.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Components, functional or otherwise, shown in the figures and/or discussed herein as being connected or communicating with each other are communicatively coupled. That is, they may be directly or indirectly connected to enable communication between them.

What is claimed is:

1. An apparatus for accessing web pages, the apparatus comprising:
    a communication interface; and
    a processor communicatively coupled to the communication interface and configured to:
        receive a web crawler request, from the communication interface, to access a specified web page;
        select a first selected proxy server from among a plurality of proxy servers;
        send, via the communication interface, a first access request to the first selected proxy server requesting access to the specified web page;
        receive, via the communication interface, a response from the first selected proxy server corresponding to the first access request;
        analyze the response from the first selected proxy server;
        select a second selected proxy server from among the plurality of proxy servers in response to determining from the response that the first access request was denied; and
        send, via the communication interface, a second access request to the second selected proxy server requesting access to the specified web page.

2. The apparatus of claim 1, wherein the processor is configured to schedule a third access request requesting access to the specified web page for later transmission to one of the plurality of proxy servers of the plurality of proxy servers in response to a threshold amount of failed access to the specified web page.

3. The apparatus of claim 2, wherein the threshold amount of failed access is a threshold number of access requests being denied access to the specified web page.

4. The apparatus of claim 2, wherein the threshold amount of failed access is a threshold amount of time since the first access request is sent.

5. The apparatus of claim 2, wherein to schedule the third access request the processor is configured to place the third access request in a queue of web page requests.

6. The apparatus of claim 1, wherein to select the first selected proxy server the processor is configured to select randomly from among the plurality of proxy servers.

7. The apparatus of claim 1, wherein the processor is configured to establish persistent connections to a web crawler and the plurality of proxy servers via the communication interface.

8. The apparatus of claim 1, wherein the first access request and the second access request are configured to request access to all of the specified web page.

9. A non-transitory, processor-readable storage medium comprising processor-readable instructions stored thereon configured to cause a processor to:
   select a first selected proxy server from among a plurality of proxy servers in response to receipt of a web crawler request, from a communication interface, to access a specified web page;
   send, via the communication interface, a first access request to the first selected proxy server requesting access to the specified web page;
   analyze a response from the first selected proxy server corresponding to the first access request;
   select a second selected proxy server from among the plurality of proxy servers in response to determining from the response that the first access request was denied; and
   send, via the communication interface, a second access request to the second selected proxy server requesting access to the specified web page.

10. The storage medium of claim 9, wherein the instructions are configured to cause the processor to schedule a third access request requesting access to the specified web page for later transmission to one of the plurality of proxy servers of the plurality of proxy servers in response to a threshold amount of failed access to the specified web page.

11. The storage medium of claim 10, wherein the threshold amount of failed access is a threshold number of access requests being denied access to the specified web page.

12. The storage medium of claim 10, wherein the threshold amount of failed access is a threshold amount of time since the first access request is sent.

13. The storage medium of claim 10, wherein to schedule the third access request the instructions are configured to cause the processor to place the third access request in a queue of web page requests.

14. The storage medium of claim 9, wherein to select the first selected proxy server the instructions are configured to cause the processor to select randomly from among the plurality of proxy servers.

15. A method for accessing a web page, the method comprising:
   receiving a web crawler request, from a web crawler via a communication interface, to access a specified web page;
   selecting a first selected proxy server from among a plurality of proxy servers;
   sending, via the communication interface, a first access request to the first selected proxy server requesting access to the specified web page;
   receiving, via the communication interface, a response from the first selected proxy server corresponding to the first access request;
   analyzing the response from the first selected proxy server;
   selecting a second selected proxy server from among the plurality of proxy servers in response to determining from the response that the first access request was denied; and
   sending, via the communication interface, a second access request to the second selected proxy server requesting access to the specified web page.

16. The method of claim 15, wherein the method is for accessing web pages from a crawler adapter that includes the communication interface, the method further comprising establishing always-on connections between the crawler adapter and the plurality of proxy servers.

17. The method of claim 15, further comprising scheduling a third access request requesting access to the specified web page for later transmission to one of the plurality of proxy servers of the plurality of proxy servers in response to a threshold amount of failed access to the specified web page.

18. The method of claim 17, wherein the threshold amount of failed access is a threshold number of access requests being denied access to the specified web page or a threshold amount of time since the first access request is sent.

19. The method of claim 17, wherein scheduling the third access request comprises placing the third access request in a queue of web page requests.

20. The method of claim 15, wherein selecting the first selected proxy server comprises randomly selecting the first selected proxy server from among the plurality of proxy servers.

* * * * *